March 2, 1937. J. A. OBERMAIER 2,072,312
TEMPERATURE INDICATING INSTRUMENT
Filed July 28, 1934 2 Sheets-Sheet 2

Inventor:
John A. Obermaier
By Williams, Bradbury, McCaleb & Hinkle
Attys.

Patented Mar. 2, 1937

2,072,312

UNITED STATES PATENT OFFICE 2,072,312

TEMPERATURE INDICATING INSTRUMENT

John A. Obermaier, Chicago, Ill.

Application July 28, 1934, Serial No. 737,327

1 Claim. (Cl. 73—32)

The present invention relates to temperature indicating instruments and is particularly concerned with devices of the type adapted to indicate the operating temperatures of water, oil, air, and/or exhaust gases of internal combustion engines, such as Diesel engines, or the like.

The efficient operation of such engines depends upon the proper distribution of the load among the several cylinders and proper combustion in each of the cylinders, and efficient operating conditions can only be maintained by means of adjustments effected after measuring the temperature conditions at various points.

One of the objects of the invention is the provision of an improved temperature indicating instrument which is adapted to indicate accurately all of the various operating temperatures for the water, oil, air and/or exhaust gases of such an internal combustion engine.

Another object of the invention is the provision of an improved temperature indicating instrument of the class described in which the manual operations required by the user are reduced to a minimum so that there is less possibility of error in determination of temperatures.

Another object of the invention is the provision of an improved temperature indicating instrument of the class described which may be adapted both for automatic compensation of a cold end temperature of a thermo-couple or for the manual adjustment of the instrument so as to compensate for the variations in temperature of the cold end of the thermo-couple.

Another object is the provision of an improved temperature indicating instrument of the class described in which all of the connections for effecting a measurement of a certain temperature are accomplished by a common switching device, so as to reduce the amount of manipulation necessary.

Another object is the provision of the device of the class described in which the arrangement is such that the battery or source of electromotive force may be disconnected during the time the switching is being effected, so that the bridge is neither thrown out of balance by short circuit nor by breaking the circuit while the battery is connected.

Other objects and advantages of the invention will be apparent from the following description and the accompanying drawings in which similar characters of reference indicate similar parts throughout the several views.

Referring to the drawings, of which there are two sheets, Fig. 1 is a front elevational view of the instrument casing showing the dial of the galvanometer;

Fig. 3 is a diagrammatic view of a fragment of the switching mechanism showing the switch for quickly making and breaking the battery connection while other contacts are being moved;

Fig. 4 is a fragmentary and elevational view of the mechanism of Fig. 3;

Fig. 5 is a fragmentary view of the snap disc for the switch of Fig. 3; and

Fig. 6 is a fragmentary wiring diagram of a portion of a modification which is used in connection with the rest of the diagram of Fig. 2 when the cold end compensator is to be adjusted manually.

Figure 1:
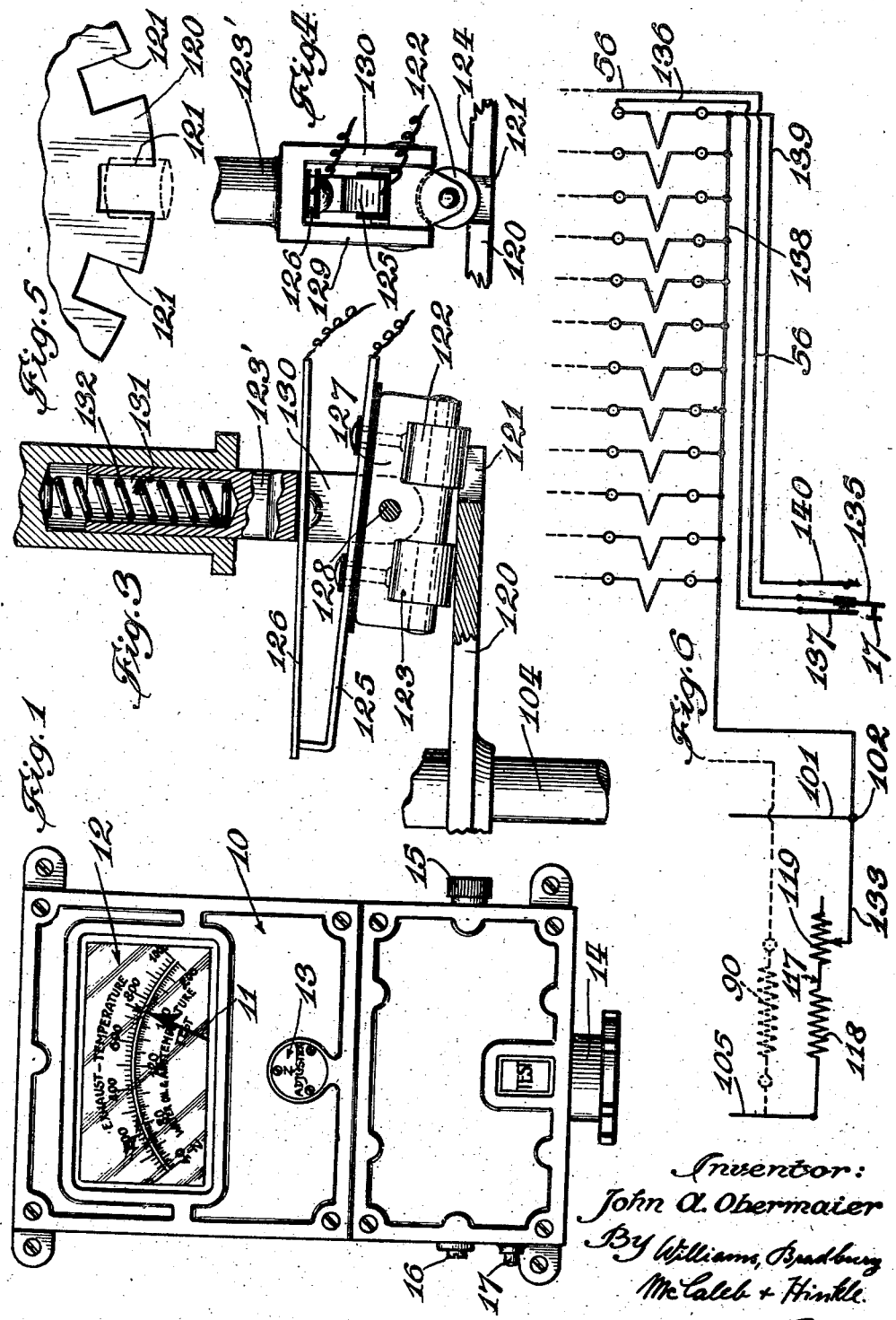
Figure 2:
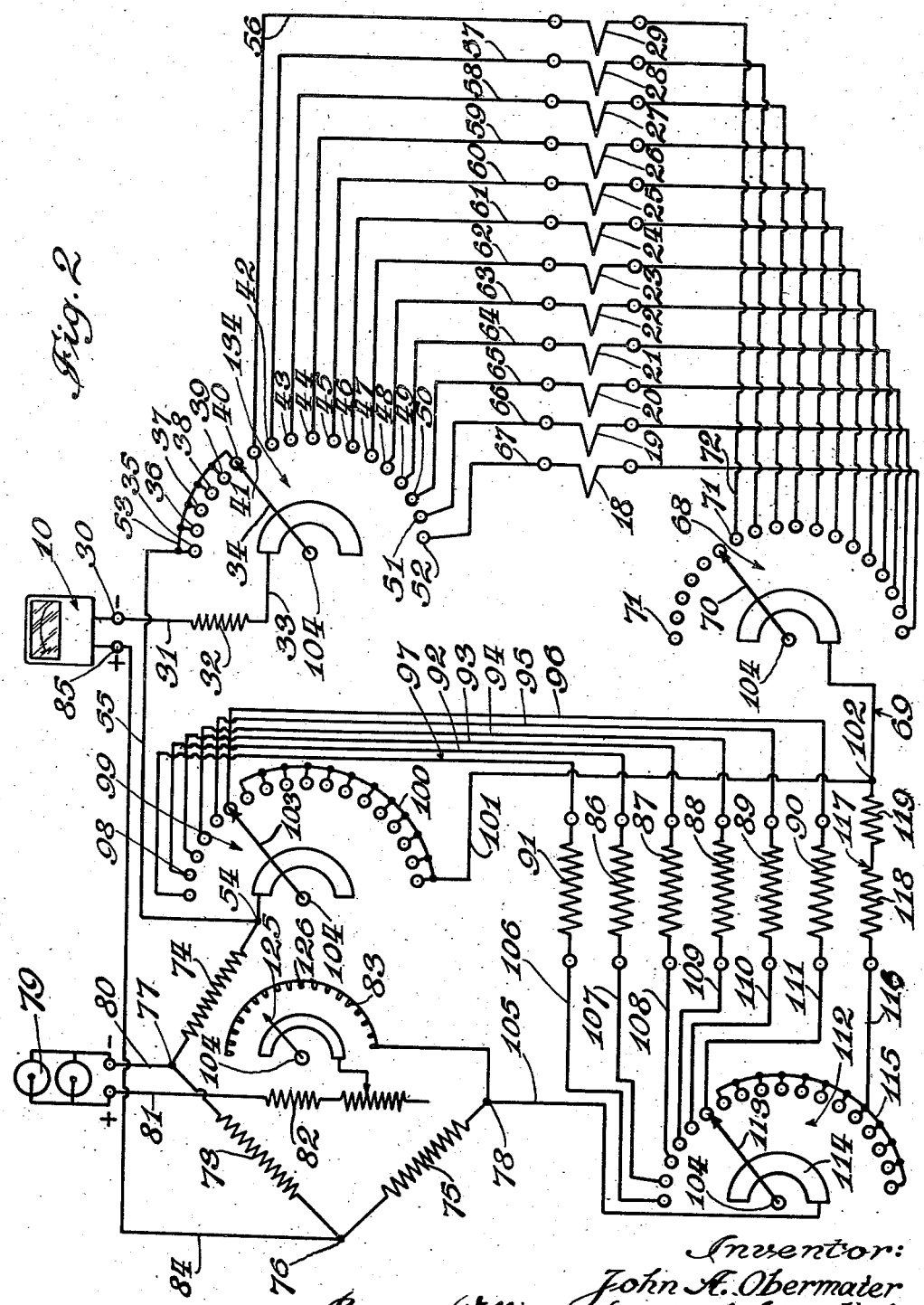
Fig. 2 is a wiring diagram of a temperature indicating instrument constructed according to the present invention.

Referring to Fig. 1, 10 indicates in its entirety the electrical indicating instrument which is fundamentally a volt-meter or galvanometer and which is included in the circuit of Fig. 2. This instrument is preferably provided with the usual pointer 11 and dial 12, the dial having appropriate scale divisions and temperature indicia for the ranges of temperatures to be measured. In the present case there are two ranges, zero to 1000 for measurement of exhaust gas temperatures, and 40 to 200 degrees Fahrenheit for measurement of the water, oil, or air temperatures. The adjusting screw 13 marked "Z adjuster" is the usual zero adjustment screw which changes the position of the needle 11 by moving the fixed abutment of the spring which urges the needle to zero position.

The knob 14 controls a shaft which actuates a multiplicity of different switches, most of which are rotary switches for controlling the various connections of the heat responsive elements which have their changes in temperature indicated on the galvanometer 10. Knob 14 is provided with appropriate indicia, such as the word "Test" which is used for test of the battery, "Oil sump", "Water inlet", "Water outlet", "Oil piston", "Oil cooler", and also indicia for each of the exhaust temperatures for a number of cylinders, such as for example ten cylinders.

15 indicates the knob of a rheostat used for adjusting the battery voltage. 16 indicates the screw for adjustment of the resistance which compensates for the cold end temperature of the thermo-couples. 17 indicates a push button used for cutting out the thermo-couples while the adjustment of the compensating resistance is made. The latter two members 16 and 17 are, of course, only employed when the cold end adjustment is manual instead of automatic.

Referring to Fig. 2, 10 indicates the galvanometer which is used as the indicator for all of the temperatures measured by the present device. For the purpose of measuring temperatures within the range of zero to 1000 degrees Fahrenheit, the device is preferably provided with a multiplicity of thermo-couples 18 to 29, inclusive. Each of these thermo-couples consists of a pair of wires of dissimilar metals of suitable characteristics, so that an electromotive force is generated due to the difference in temperature between the hot junction of the thermo-couple and the cold junction. The characteristics of these thermo-couples depend upon the specific temperatures to be measured.

The negative terminal 30 of galvanometer 10 may be connected by conductor 31 to a calibrating resistance 32, which in turn is connected by conductor 33 to the switch arm 34. Switch arm 34 is adapted to wipe over the contacts 35 to 52, inclusive, in order to effect a proper connection for this terminal of the galvanometer to the other elements of the circuit. The first six contacts, 35 to 40, may be joined together by a conductor 53, which is connected to one end 54 of a bridge by conductor 55. The other twelve contacts, 41 to 52, are each connected by appropriate conductors 56 to 67, inclusive, to the thermo-couples 18 to 29, inclusive.

Where it is not desired to isolate these thermo-couples completely, the rotary selector switch 68 may be eliminated and connection made directly from the opposite terminals of the thermo-couples 18—29 to conductor 69; in such case the connection would only be broken at one end of the thermo-couple.

In the present embodiment a rotary selector switch 68 is provided having a switch arm 70 and a multiplicity of contacts 71. The last twelve of these contacts are connected by conductors 72, respectively, to the opposite terminals of the thermo-couples. The first six contacts would be dead in this case.

The device is also preferably provided with a Wheatstone bridge having the fixed resistances 73, 74, 75, the junctions of the bridge being indicated at 76, 77, 54, 78. A battery or constant source of electromotive force 79 has one terminal connected by a conductor 80 to the junction 77. The opposite terminal of battery 79 is connected by conductor 81 through a battery rheostat 82 and battery switch 83 to the junction 78. The junction 76 of the bridge is connected by conductor 84 to the other terminal 85 of galvanometer 10.

The device is preferably provided with a multiplicity of thermo-bulbs 86—90, each bulb having a resistance which changes with a change of temperature. The Wheatstone bridge and galvanometer are, in effect, a device for measuring resistance for the determination of the thermo-bulb temperature, the instrument being calibrated in terms of temperature.

In order to effect a test of the battery voltage, a battery test resistance 91 is also included in the circuit and controlled by the rotary selector switches, this resistance being in circuit when the knob 14 is set at test. One terminal of each of the resistances 86—91 is connected by the conductors 92—97, respectively, to the first six contacts 98 of the rotary selector switch 99. The other twelve fixed contacts of rotary selector switch 99 are joined by conductor 100 and connected by conductor 101 to the conductor 69 at 102.

Selector switch 99 has a rotating switch arm 103 actuated by shaft 104, which is the common shaft controlled by knob 14 for actuating all of the selector switches.

Whenever it is not considered desirable to completely isolate the thermo-bulbs, the opposite terminal of the thermo-bulbs may be connected directly to the conductor 105, but when it is desired to completely isolate the thermo-bulbs, their opposite terminals may be connected by conductors 106—111 to the first six contacts of the rotary selector switch 112. The switch arm 113 is connected by an appropriate brush to a segment 114, which is connected to conductor 105. The lower twelve contacts of this selector switch may be joined together by conductor 115 and connected by conductor 116 to the opposite end of a cold end compensator resistance 117. This compensator resistance may consist of a section of manganin resistance 118 and a section of nickel resistance 119, the variation in the resistance of the nickel being adapted to compensate for the variation in temperature of the cold ends of the thermo-couples.

The battery switch 83 is a switch operated by the same shaft 104 and is shown diagrammatically as a rotary switch, but an ordinary rotary switch is not adapted to effect the battery switching with sufficient rapidity, and Figs. 3 to 5 show a switching arrangement which may be employed for switch 83.

Referring to Fig. 3, the shaft 104 preferably is provided with a snap disc 120 consisting of a metallic disc having a multiplicity of radial slots 121 in its periphery. The slots 121 are adapted to partially receive a spring-pressed roller 122 which is carried by a plunger 123', and when the roller 122 is in slot 121 the switch arms 34, 70, 103 and 113 are in registration with predetermined contacts. The shaft 104 is adapted to rotate the disc 120 with the switch arms, the roller 122 being cammed upwardly out of the slots 121 on the plane surface 124 of the disc 120 until the switch arms register with another contact, when the roller 122 again drops into the slot. The disc and roller, in effect, comprise a snap arrangement for the rotary selector switches to retain the switches in registration with the contacts by which they are set in the present embodiment. The battery switch preferably comprises two switch elements 125, 126. The switch arm 125 is insulated from but mounted upon a rocking stirrup 127 upon which the roller 122 is mounted. A second roller 123 is rotatably mounted on stirrup 127 upon the opposite side of pivot 128. The roller 123 engages the plane surface of disc 120 at all times.

The plunger 123' is bifurcated and provided with legs 129, 130 at its lower end for pivotally mounting the stirrup 127. Switch arm 126 is insulated from but fixedly mounted on plunger 123'. Plunger 123' is slidably mounted in the sleeve 131 and urged outwardly by compression of spring 132, and the complete plunger assembly is fixedly mounted with respect to the rotation of the disc 120.

The operation of the battery switch 83 is as follows: when the contacts of the selector switches 34, 70, 103, 113 are engaged by a switch arm, roller 122 is in slot 121, the contacts 125, 126 are closed. As soon as the switch arms 34, 70, 103, 113 start to move away from the central position of a fixed contact, roller 122 cams upward out of slot 121 and the rocking motion of stirrup 127 breaks contact between arms 125, 126. Contact is broken before the selector arms bridge between two adjacent contacts, so that the battery is disconnected before there is any short circuiting of two contacts or inclusion of two thermo-couples or thermo-bulbs in the circuit. The battery circuit is quickly closed again when the rotary selector switch arms reach the center contact position of the next contact, thus the battery circuit is is always broken during the switching operation so that the bridge is not thrown out of balance during the switching operations. The galvanometer needle is neither thrown violently to the right nor to the left and damage to the galvanometer is prevented. The battery circuit is quickly broken and quickly made, due to the fact that the switch arms 125, 126 are of substantial length and the roller 122 snaps into and out of slots 121.

Referring to Fig. 6, this is a modification shown by the fragment of a wiring diagram which may be substituted for the lower portion of Fig. 2. When it is desired to adjust the cold end compensator manually, the circuit of Fig. 6 may be employed. In this case the nickel section 119 of the cold end compensator 117 is provided with an adjustable contact 133 which may be actuated by the adjustment screw 16. Adjustable contact 133 is connected at 102 to the conductor 101. The opposite end of the cold end compensator 117 is connected by conductor 105 to bridge junction 78. While this manual adjustment of the cold end compensator is made, it is desirable to cut all of the thermo-couples out of the circuit so as to remove the indicator 10 from the influence of the thermo-couples. Therefore, conductor 56 leading to the seventh contact on selector switch 134 may be connected to the center contact 135 of a double throw push button switch, the push button being No. 17 in Fig. 1. The first thermo-couple is connected by conductor 136 to a switch leaf contact 137. The common lead 138 from the opposite end of all of the thermo-couples is connected by conductor 139 to switch leaf contacts 140. When the push button 17 is pushed, the cold end compensator 117 is connected directly back to the needle 10 through conductors 133, 138, 139, 140, 135, 56, 34, 33, 32, 30. The thermo-couples 18—29 are cut out of circuit by the separation of the contacts 135, 137.

It should be understood that the cold junctions of the thermo-couples may be located wherever it is most economical to locate them. Where the indicating instrument is at a great distance, the thermo-couple wires are too expensive to extend to the instrument, and in such case the cold junction may be located close to the hot junction and copper wires extended to the instrument. The cold end compensator should, of course, be located close to the cold end of the junctions of the thermo-couples.

The operation of the present indicating instrument is as follows: when it is desired to check up the voltage of the battery, the knob 14 is turned to the "test" position. The switch arm would then make contact with the first contact of selector switch 103. The battery rheostat 82 may then be adjusted by means of knob 15 until the needle 11 registers with the test mark shown at "T" in Fig. 1 on the dial 12. While this test is being made, all of the thermo-couples and thermo-bulbs are out of circuit. When it is desired to adjust the cold end compensator, assuming the manual adjustment type is used, the cold junction temperature is first determined, the selector switches are set at test positions, push button 17 is actuated to cut out the thermo-couples and the rheostat 133 adjusted by screw 16 until the needle 11 indicates this cold junction temperature on the dial; thereafter the temperatures of the engine may be measured at the various points on the indicator by merely turning the knob 14 to its respective positions and reading the temperatures on the dial. The first six positions are, of course, read on the lower dial indicia, while the higher temperatures of the last twelve positions are read on the upper dial indicia. Obviously, if an automatic cold end compensator is used, it is not necessary to determine the cold end junction temperature.

It will thus be observed that I have invented an improved temperature indicating instrument which is adapted to measure accurately temperatures throughout a wide range by means of the switching arrangements described. The instrument is protected against excessive current and the temperature of water, oil or air may be measured on the same indicating instrument as the exhaust gas temperatures.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

In a temperature indicating instrument, the combination of a plurality of thermo-bulbs with an electrical resistance measuring instrument calibrated in terms of temperature for indicating the temperature of said bulbs, a source of electrical energy for energizing said instrument, switching means for controlling the connection of said bulbs to said indicating instrument, and switching means operable coincidentally with the first mentioned switching means for automatically disconnecting the source of electrical energy from said instrument during the major portion of the movement of said first mentioned switching means to prevent surges of current in said indicating means during the switching operation, said second mentioned switching means comprising a rotatable member carried by a shaft controlling said first-mentioned switching means, said rotatable member having a plurality of slots provided with camming shoulders, and interengageable contacts resiliently mounted, one of said contacts being provided with a pair of camming rollers oppositely located with respect to the point of pivot of said latter contact, said rollers engaging said rotatable member in such manner that the contacts are brought into engagement when one of said rollers engages in one of said slots.

JOHN A. OBERMAIER.